United States Patent
Reutlinger

(10) Patent No.: US 6,696,811 B2
(45) Date of Patent: Feb. 24, 2004

(54) METHOD FOR REGULATING AN ELECTRICAL MACHINE BY MEANS OF A PULSE-WIDTH MODULATION INVERTER

(75) Inventor: Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,615

(22) PCT Filed: May 31, 2001

(86) PCT No.: PCT/DE01/02063

§ 371 (c)(1),
(2), (4) Date: Jul. 1, 2002

(87) PCT Pub. No.: WO02/09266

PCT Pub. Date: Jan. 31, 2002

(65) Prior Publication Data

US 2002/0175649 A1 Nov. 28, 2002

(30) Foreign Application Priority Data

Jul. 25, 2000 (DE) .......................................... 100 36 099

(51) Int. Cl.⁷ .................................................. G05B 1/02
(52) U.S. Cl. ........................ 318/606; 388/806; 388/801; 388/803
(58) Field of Search .................. 318/606, 609, 318/599; 388/806, 801, 803, 822, 823, 842, 843, 847, 848, 849

(56) References Cited

U.S. PATENT DOCUMENTS 6,385,555 B1 * 5/2002 Hoffmann et al. .......... 702/145

FOREIGN PATENT DOCUMENTS

| DE | 41 15 338 A | 11/1992 |
| DE | 197 33 212 A | 2/1999 |
| DE | 197 47 412 A | 4/1999 |
| DE | 198 27 556 A | 12/1999 |
| EP | 0 762 596 A1 | 3/1997 |
| EP | 0 762 596 A | 3/1997 |

* cited by examiner

Primary Examiner—Karen Masih
(74) Attorney, Agent, or Firm—Michael J. Striker

(57) ABSTRACT

The invention relates to a method for regulating an electrical machine (1) with an excitation winding (2) and a stator winding (3). The stator winding (3) is connected at its output terminals (10) to a converter bridge (5). The electrical machine (1) can be operated in the regulation ranges of field-oriented regulation (11), field-weakening operation (12), and diode operation (13). The transition from one of the regulation ranges (11, 12, 13) to a respective adjacent regulation range (11, 12, 13) is achieved through an over-modulation of the pulse-to-width modulation (26) and a limitation of the outputs from current regulators (34, 35) of the stator winding (3) of the electrical machine (1).

12 Claims, 3 Drawing Sheets

Figure 1:
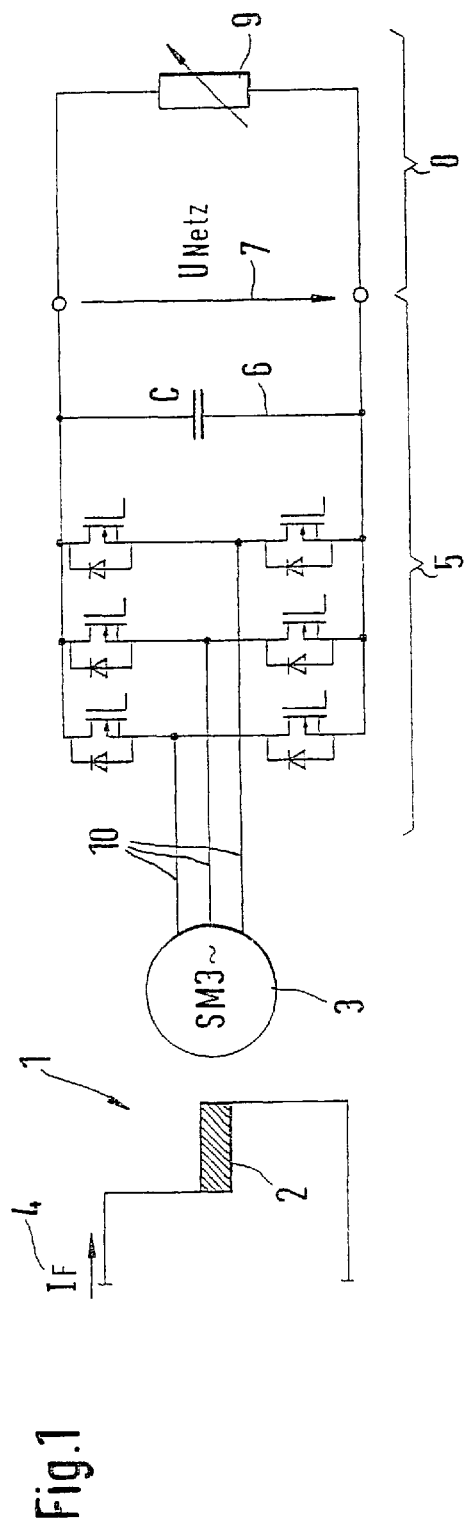

METHOD FOR REGULATING AN ELECTRICAL MACHINE BY MEANS OF A PULSE-WIDTH MODULATION INVERTER

TECHNICAL FIELD

In generators that are used in motor vehicle applications, the demands on the dynamics of the torque are not especially rigorous. In such generators for use in motor vehicles, the torque must not increase too rapidly since otherwise, a powerful generator could in the extreme case stall the internal combustion engine of the motor vehicle. If generators are designed and used as claw-pole generators, they are operated with a diode bridge. In order to increase output, however, attempts have also been made to operate these machines on a pulse inverter. In addition to the requirement for an optimal efficiency for all operating points of the generator, the question of a suitable regulation of the generator over the entire speed and output range also arises.

PRIOR ART

In current uses of claw-pole generators, they are operated for the most part with attached B6 rectifier bridges. In this instance, electrical machines such as a claw-pole generator offer advantages, among others the fact that they can be produced inexpensively. The advantages of the claw-pole generator principle should be retained as much as possible if, in order to increase the output of the claw-pole generators used, this type of generator is operated with pulse-to-width modulation converters. As a result, the claw-pole generators can also be operated as electric motors. This opens up interesting possibilities for using this type of generator in the starting process of a motor vehicle, transmission synchronizations, and other uses specific to motor vehicles.

In addition to a generator operation of a claw-pole machine, it can also be used in motor operation, where the converter remains unaffected by this change in operating mode. The regulator offers the possibility of affecting the electrical machine, namely the excitation current and the stator current. This permits the achievement not only of a field-weakening, but also of an electric loading in the stator of the electrical machine in the direct-axis direction. Furthermore, by reducing the excitation current of the magnet wheel, a true field-weakening operation can be established. In the claw-pole machine, there is a pronounced magnetic uniaxiality, which depends heavily on the operating point set and therefore influences the capacity of such an electrical machine to be regulated.

EP 0 762 596 A1 has disclosed a motor vehicle generator regulation that produces a direct current, which can be accessed at a direct current output. A three-phase stator winding has three output terminals; a rotor is magnetically coupled to the stator windings in which an electromotive force is produced. Between the direct current output and the three output terminals of the stator winding, a rectifier bridge is connected, which is controlled by means of a regulator in order to control the phase shift between the electromotive force in the stator winding and the phase voltages of the output terminals of the stator winding.

In lieu of diodes in rectifier bridges, triggerable switch elements are used, which can be triggered by means of a separate triggering device.

DESCRIPTION OF THE INVENTION

With the regulating method for electrical machines that is proposed according to the invention, by means of an intentional overmodulation of the pulse-to-width modulation, a reliable transition can be achieved from the sinusoidal regulating operation, into the blocking operation, and on into a second regulation range. Since the regulating strategy for the regulation ranges produced in the claw-pole machine must take into account three different regulation ranges and their requirements, the boundaries of the adjacent regulation ranges must be detected so that a switch from one regulating strategy into another can be executed with no great difficulty. With one and the same regulating structure, PI components included, there can be a transition from the regulation range of a field-oriented regulation to the regulation range in which regulation occurs based on field-weakening, without having to use another regulator. The change of the regulation ranges occurs smoothly and therefore imperceptibly to the outside observer. In contrast to prior regulating methods, which for the most part also operate with sinusoidal voltages and currents, in the regulating method according to the invention, a transition is made to block voltages, which permit an improved voltage utilization.

In addition to the base speed range, a field-weakening operation can also be automatically produced, since the direct-axis current in the electrical machine occurs automatically as a result of machine properties. In prior regulating methods for generators that are used in motor vehicles, tabularly stored interrelationships of engine speed, supply voltage, and the desired output are consulted, which are correlated with the reference currents of the generator to be used. In this case, a voltage regulation over the entire regulation range of the generator is required, which, however, is only possible with voltage reserve when the electrical machine is operated with a converter. Since the converter is limited by the converter ceiling voltage, a reserve must be maintained with regard to this voltage, which reduces the output. This limitation can be overcome through the use of the method proposed according to the invention.

DRAWINGS

The invention will be explained in detail below in conjunction with the drawings.

Figure 2:
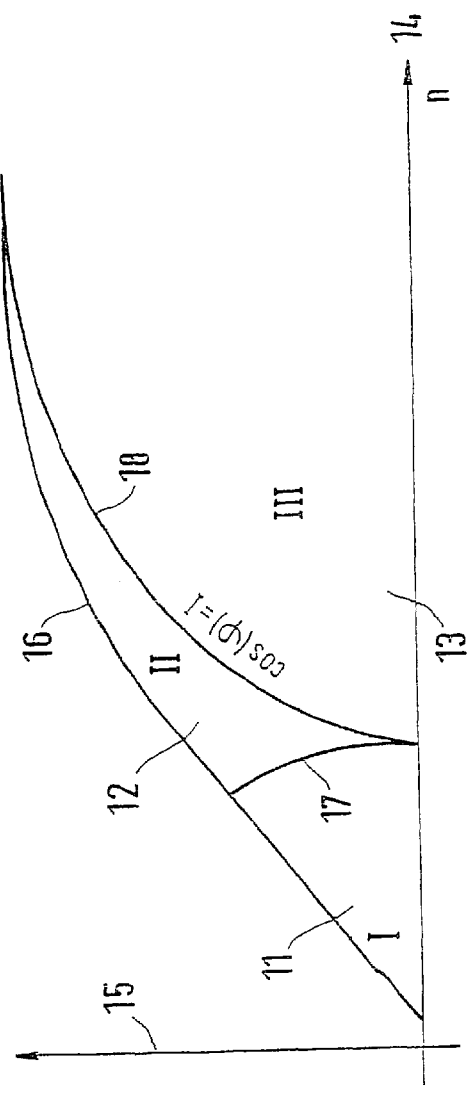
Figure 3:
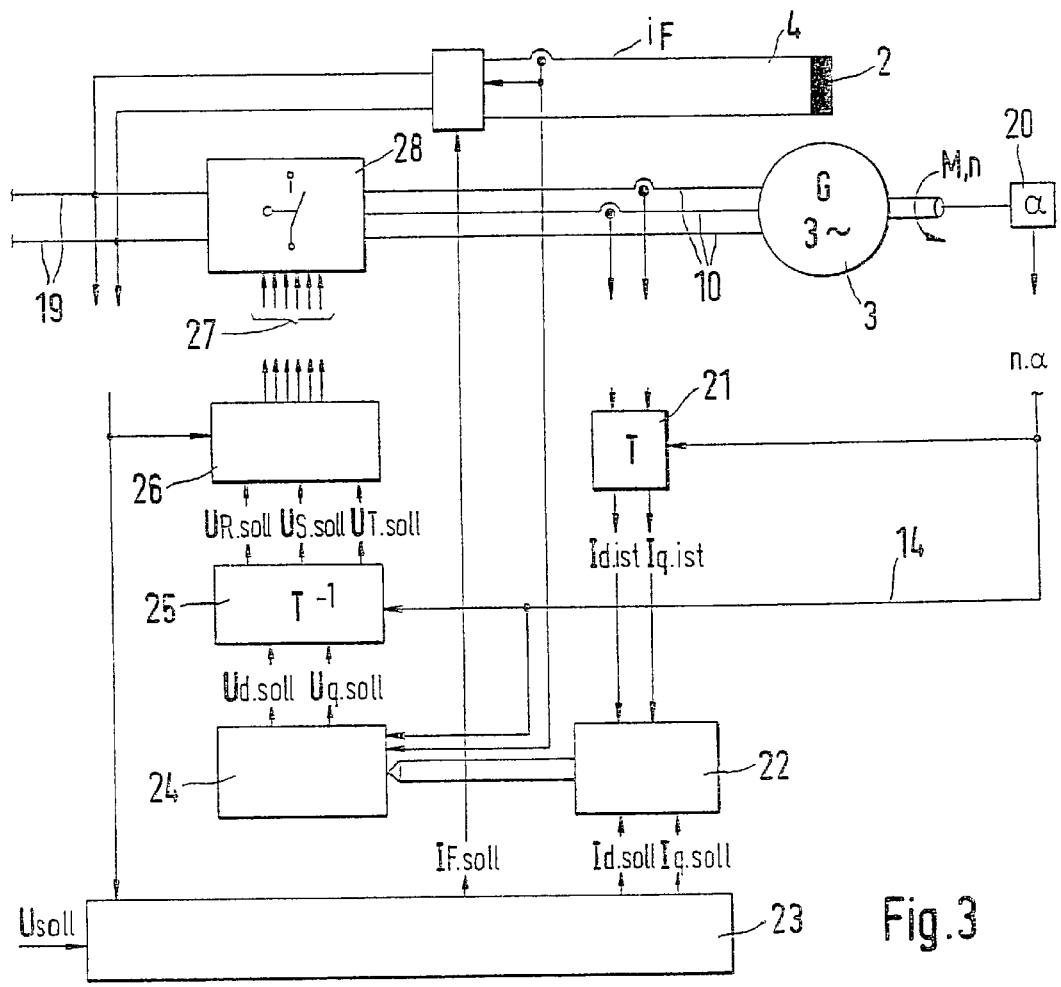
Figure 4:
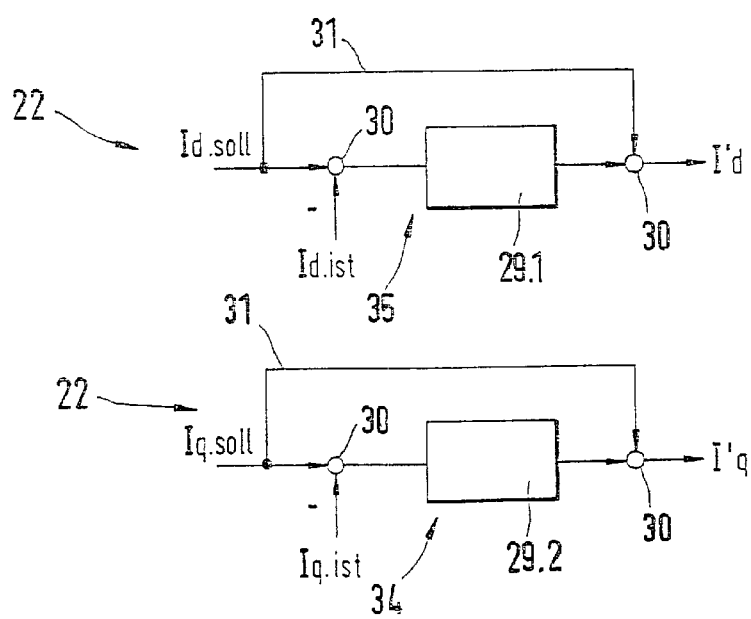
Figure 5:
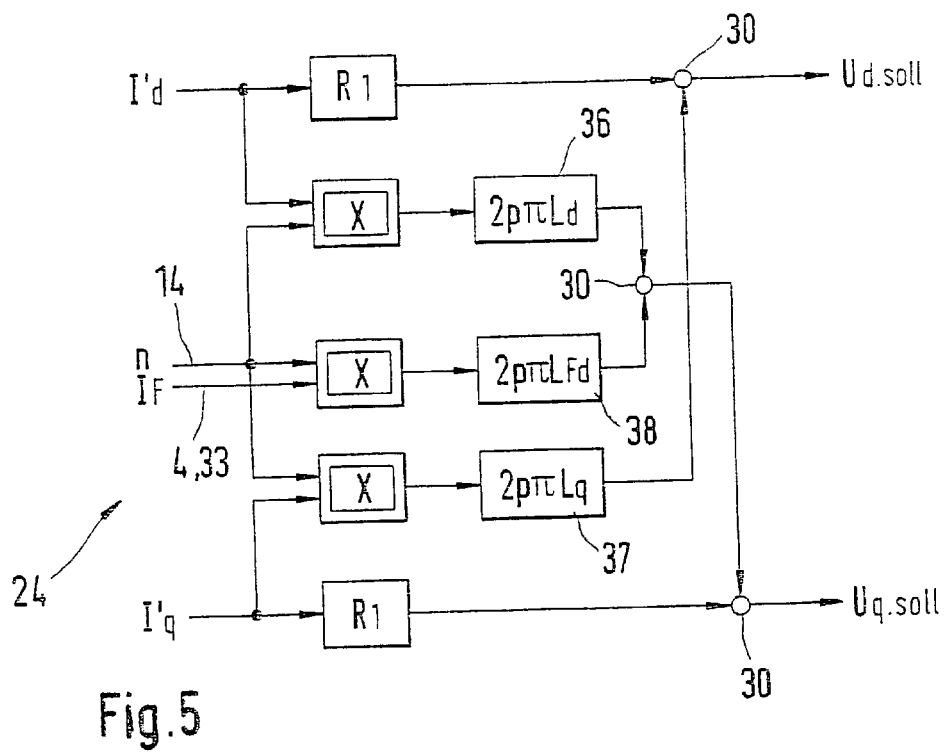
Figure 6:
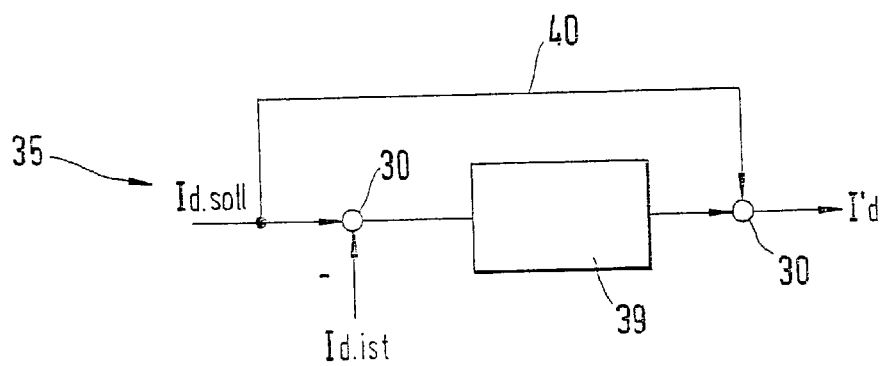
Figure 6:
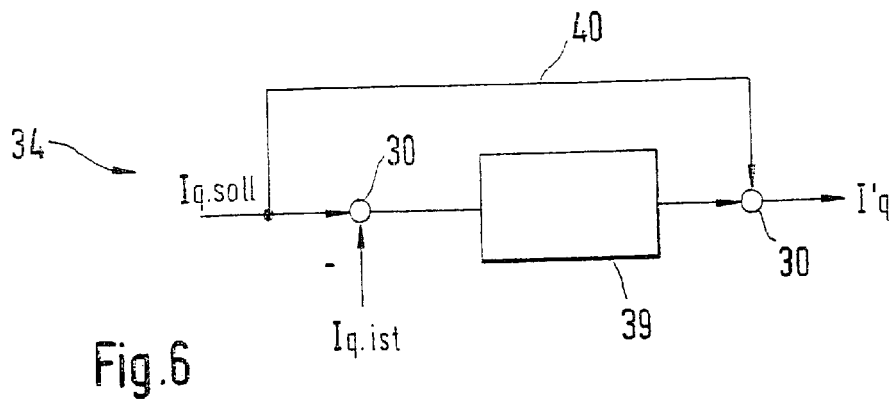

FIG. 1 shows an electrical machine with an attached converter bridge,

FIG. 2 shows three regulation ranges of an electrical machine, the field-oriented regulation range, the field-weakening regulation range, and the diode operation regulation range, FIG. 3 shows the regulation structure for a regulation of an electrical machine in the field-oriented regulation range, FIG. 4 shows a control regulator configuration for a d, q-system, FIG. 5 shows a simplified depiction of a decoupling network as a part of a d, q-system FIG. 6 shows a current regulator configuration for the regulation range of the field-oriented regulation and the field-weakening operation with an output value limitation and a pre-control branch.

Embodiments

FIG. 1 shows an electrical machine with a converter bridge connected to it, which can be wired preferably as a B6 rectifier bridge.

The electrical machine 1, which is only schematically represented here by means of an excitation winding 2 and a stator winding 3, is connected to a rectifier bridge 5 by means of phase winding connection terminals 10. The current $i_F$ flowing in the excitation winding is identified with the reference numeral 4. When regulating the electrical machine in diode operation 13 (corresponds to regulation range III), the rectifier bridge 5 does not have to be controlled. In the regulating range 13, the output is regulated by means of the excitation current. A regulation in this regulation range by means of the stator currents takes place again only if the required electrical power can no longer be achieved in the regulation range 13, the diode operation regulation range. The process then moves beyond the regulation range 13.

Connected in parallel with the network voltage $u_{net}$, which is identified by the reference numeral 7, there is a capacitance 6, as well as a variable load 8, characterized by means of an adjustable ohmic resistance 9.

FIG. 2 shows the position of the regulation ranges of field-oriented regulation, field-weakening operation, and diode operation.

In FIG. 2, the regulation range I for the field-oriented regulation is delimited by the output limit 16 of the electrical machine 1 and by its voltage limit 17. In this range, there is a linear relationship of the speed 14 to the electrical power 15 that is output in the generator operation of the electrical machine 1.

The field-weakening range II, identified by the reference numeral 12, is delimited at the bottom by the course of the power factor cos$\phi$=1 (or =−1), but is delimited at the top by the output limit 16 and the voltage limit 17.

The diode operation III, reference numeral 13, is delimited in the course 18 of the power factor cos$\phi$=1 (or =−1), which asymptotically approaches the course 16 of the output limit of the electrical machine 1.

The regulating range I, reference numeral 11, corresponds to a field-oriented regulation. In this range, the terminal voltage of the electrical machine 1 has not yet reached the ceiling voltage (the maximal possible output voltage of the machine) of the converter bridge 5. The maximal efficiency of the electrical machine 1 is achieved when the minimal current flows in the stator 3 with a constant power output. If the magnetic uniaxiality characteristic of a claw-pole machine, is disregarded at first, this maximal efficiency is achieved when a purely quadrature-axis current $i_q$ flows in the stator 3 and the direct-axis current $i_d$ is at 0. In the regulating range I (reference numeral 11), the converter bridge 5 has not yet reached its voltage limit and the desired stator current can be set. The excitation current $i_F$ is set to its maximal value, which results in a minimum of stator current being required for the necessary electrical power. The losses in the stator winding 3 exceed the exciter losses by a wide margin; it is therefore advantageous to increase the excitation current $i_F$ to the maximal value and to minimize the stator current in order to optimize the efficiency. The maximal moment is limited by the maximal stator current; the power increases linearly with the speed 14.

The regulation range labeled II corresponds to the field-weakening range 12. The range II is reached when the machine voltage of the electrical machine 1 has reached the ceiling voltage, i.e. the maximal voltage value of the converter 5. The converter 5 can no longer increase the voltage at the terminals 10. A field-weakening range is produced by means of a direct-axis current $i_d$ in the electrical machine 1. However, the excitation current $i_F$ remains at its maximal value in order to achieve a minimal stator current, which has a favorable effect on the efficiency that can be achieved with the electrical machine 1. The power equation $$P = \frac{3}{2} \cdot i_q \cdot u_p$$

clearly demonstrates that the power is not influenced by the stator direct-axis current $i_d$, but by the stator quadrature-axis current $i_q$. However, with increasing speed 14, the quadrature-axis current $i_q$ of the electrical machine must be reduced since the stator must also carry a direct-axis current $i_d$.

$$I_{eff} = \sqrt{\frac{1}{2}(i_d^2 + i_q^2)}$$

The quadrature-axis current $i_q$ of the electrical machine is negative due to the generator operation. The direct-axis current $i_d$ is likewise negative in order to achieve a field-weakening.

The third regulation range, identified with the reference numeral 13, corresponds to the diode operation of the converter bridge 5.

If the direct-axis current id in the electrical machine 1 reaches a value at which the power factor cos$\phi$ of the electrical machine 1 has reached the value −1, then a change in the regulation structure is indicated. The regulation range 2 of the field-weakening operation could easily be extended toward higher speeds, but a better efficiency of the electrical machine 1 is achieved if the excitation current 4 of the electrical machine 1 is reduced. With the boundary condition of a constant terminal voltage 10, the efficiency reaches a maximum when the power factor cos$\phi$ reaches the value 1 (−1) (generator operation). The current and voltage are then in phase and in the case of a constant network voltage $u_{net}$ (ceiling voltage of the converter bridge 5), the phase voltage is then at a minimum and consequently, the power loss is also at a minimum. The diode operation corresponds to today's operation of a generator with a B6 diode bridge. The output is regulated by means of the excitation current $i_F$, reference numeral 4, in the excitation winding 2. The boundary condition of a maximal terminal voltage 10 at cos$\phi$=−1 has already been met by the rectifier bridge. In the regulation range III (diode operation), the valve triggering is deactivated. The bridge valves of the rectifier bridge 5 do not switch; by means of the parallel diodes, the converter bridge becomes a simple diode rectifier. The regulator continues to function, but without affecting the converter bridge 5; the bridge valves are only switched when the condition for the regulation range III is not met. The regulation of stator currents through control of the terminal voltage 10 is conveniently switched off in this regulation range. The further regulation of the electrical machine is executed by means of the excitation current IF, reference numeral 4. The regulation of the stator currents R, S, T is only switched back on when the required electrical output 15 can no longer be achieved in the regulation range 3, reference numeral 13.

During diode operation, the diode conducting-state power losses can be reduced by virtue of the fact that during the conductive time of the diodes, the field effect transistor is switched into a conductive state parallel to them. The conducting-state power losses of a field effect transistor are significantly lower in comparison to the diode conducting-state power losses, which are generated in the converter bridge 5 according to FIG. 1. Consequently, the power loss occurring in the electrical machine 1 during generator operation can be reduced, which brings attendant advantages in the cooling of the machine.

The switching on or switching off of the valves of the converter bridge 5 can either be controlled directly as a function of the measured current, or by virtue of the fact that the direct-axis voltage $U_d$ and the quadrature-axis voltage $U_q$ are predetermined in accordance with the measured direct-axis and quadrature-axis currents, i.e. $I_d$ and $I_q$.

FIG. 3 shows the regulation structure for a regulation of the electrical machine 1 in the field-oriented regulation range I.

In the regulation range 11 of the field-oriented regulation of the electrical machine 1, the excitation current 4 is set to its maximal value. When the excitation winding 2 is cold, the excitation current can be increased and the power of the electrical machine can be significantly increased. Based on a voltage deviation $\Delta U = U_{ref} - U_{actual}$ determined in the superior voltage regulator 23, a network factor is used to determine a required network power, which is yielded by the equation $P_{ref} = K \cdot \Delta U$. Based on this reference power and the measured machine speed 14, which is determined by means of a position sensor 20, the quadrature-axis current required for this power can be derived according to the following equation:

$$I_{q,ref} = \frac{2 \cdot P_{ref}}{3 \cdot u_p} = \frac{K(U_{ref} - U_{actual})}{3p \cdot \pi \cdot N \cdot L_{Fd} \cdot I_F} \quad \text{(Eq 1.1)}$$

For generator operation, $P_{ref}$ and $I_{q,\,ref}$ must be chosen as negative. The total current $I_1$ must be limited to a maximal value in order not to overload electrical machine 1. The current is measured and can be limited in a superior voltage regulator 23 by withdrawing the electrical power 15.

In the electrical machine 1, the actual values of the direct-axis current $I_d$ and the quadrature-axis current $I_q$ cannot be measured directly. The measured instantaneous values of the terminal amounts 10 are first transferred into the d, q-system by means of a transformation 21. Since only two of the three phase currents are measured, with the condition $$i_R + i_S + i_T = 0,$$

the transformation can be written in the following form:

$$I_{d,actual} = \frac{2}{\sqrt{3}} \cdot (i_{R,actual} \cdot \cos(p \cdot \alpha - 30°) + i_{S,actual} \cdot \cos(p \cdot \alpha - 90°))$$

and $$I_{q,actual} = -\frac{2}{\sqrt{3}} \cdot (i_{R,actual} \cdot \sin(p \cdot \alpha - 30°) + i_{S,actual} \cdot \sin(p \cdot \alpha - 90°))$$

The output values of the transformation stage 21 $I_{d,\,actual}$ and $I_{q,\,actual}$ are transmitted to a current regulator 22. The current regulator 22 can be divided into a regulation for the quadrature-axis current 34 and a regulation for the direct-axis current 35. The two regulation components 29.1, 29.2 can be simple PI regulators with a precontrol unit 31. At a summation point 30, precontrol unit respectively superimposes the regulator outputs with an amplification factor 1:

$$I'_d = I_{d\,ref} + i_{d\,controller}$$

$$I'_q = I_{q\,ref} + i_{q\,controller}$$

These output values of the subordinate current regulator 22 are supplied to a decoupling network 24, which is connected in series with the current regulator. This permits not only a precontrol, but also a neutralization of the reciprocal coupling of the two regulators 34, 35 for the quadrature-axis current and the direct-axis current by means of the subordinate voltage control and the electrical machine 1.

The decoupling network 24 is described in detail as part of the d, q-system in FIG. 5.

The depiction according to FIG. 5 shows that the output values of the current regulator 22 are transmitted as current values to the decoupling network 24 and are used to determine the required voltage values for the electrical machine 1. The decoupling network 24 contains a simplified model of the electrical machine from which the required voltages $U_{q,\,ref}$ and $U_{q,\,actual}$ can be determined. Input values of the decoupling network are the above-mentioned current values of the current regulator 22 $I'_d$, $I'_q$, the speed n (reference numeral 14) detected by the position sensor 20, and the excitation current $I_F$ of the excitation winding 2 of the electrical machine 1.

The model of the electrical machine according to FIG. 5 can be simplified for the case in which the excitation current $I_F$ is viewed as a constant and the model is limited to stationary operation.

In the uses as a vehicle generator that are provided here, no extreme demands are placed on the dynamics of the current regulation. Therefore a static consideration of a decoupling network 24 like the one shown in FIG. 5 is sufficient. The model of the decoupling network 24 is not sensitive to modeling precision and parameter errors. By means of the current regulation 22, errors in the machine parameters of the decoupling network 24 according to FIG. 5 can be compensated for; the reference values of the currents are achieved because they can be regulated with the current regulation 22. With more severe deviation of the machine parameters, the quality of the current regulation suffers and the dynamics deteriorate because the decoupling network 24 no longer provides for a complete decoupling of the two regulators 34 and 35 in the d- and q-direction with regard to the stator winding 3. The regulators 34 and 35 influence each other reciprocally. A perceptible deterioration of regulation results of the current regulation 22, though, only occurs when there is a large deviation of the parameters.

The reference values for the voltages of the machine according to the d, q-system are transmitted to an inverse transformation stage 25, where they are inverse transformed to the terminal values R, S, T of the electrical machine 1. The amplitude values of the d, q-system can be simply converted into the three reference values of the phase voltages if the position of the rotor α is used, which is easy to detect by means of the position sensor 20.

The limit of the field-oriented regulation range 11 is the ceiling value of the reference value $U_{ref}$ (the phase voltage when the stator is wired in the form of a star) if this reference value reaches half of the network voltage $U_{net}/2$. In this instance, the linear region of the voltage control (pulse-to-width modulation) is reached. The linear region can be increased by up to 15% to $U_{ref} = U_{net}/\sqrt{3}$ by means of a no-voltage override. However, if the pulse-to-width modulation 26 is overmodulated, i.e. the converter 5 is triggered with higher reference voltages, then fundamental waves can be produced in the phase winding of the electrical machine 1 up to 27% above the values of sinusoidal voltages. In its nonlinear region $U_{ref} > ½ U_{net}$, through overmodulation of an output voltage with the fundamental wave, the pulse-to-width modulation 26 produces an initial fundamental wave of 0.609 $U_{net}$ with an overmodulation of 2, and produces an initial fundamental wave of 0.632 $U_{net}$ with an overmodulation of 5. The theoretically producible value is thus achieved up to 99.3%.

In the regulation range II, the excitation current 4 of the electrical machine 1 remains at its maximal value and the converter bridge 5 functions in the basic frequency control. The switching frequency of the converter valves corresponds to the fundamental wave frequency of the electrical machine 1. The possibility of affecting the output lies in varying the load angle φ.

The regulation ranges 11 and 12 according to FIG. 2 can be covered by this same regulation structure. No conversion of the regulation is required. The range 12 is covered through deliberate overmodulation of the pulse-to-width modulation 26 and at the same time, the transition to basic frequency control is produced through an overmodulation of the pulse-to-width modulation generator 26.

FIG. 6 shows a current regulator for the ranges 11 and 12 according the depiction of the regulation ranges in FIG. 2. If the direct-axis current $I_d$ is preset to approximately 0, then it can no longer be kept set to its reference value in the direct-axis in regulation range II (reference numeral 12). The regulation difference in the regulator of the direct-axis current $I_d$ is positive so that the regulator output must be limited to a maximal value $$I_{d,\ ref}=0\ I_{d,\ actual}<0 \text{ and } I'_d=I'_{d,\ max}>0.$$

$I_{q,\ ref}$ is likewise predetermined according to the foregoing approximation (eq. 1). The current regulator 34 for the quadrature-axis current $I_q$ according to FIG. 6 must be limited to a correspondingly higher value. The regulator 34 begins to overmodulate and correctly resets the quadrature-axis current. This regulation correctly sets the quadrature-axis current, the direct-axis current $I_d$ sets itself automatically. It automatically assumes the required value for the direct-axis current for the respective operating point of the electrical machine.

The decoupling network 24 converts the current values of the regulators 34, 35 into the corresponding reference voltages for the electrical machine. In this instance, the decoupling network according to FIG. 5 is once again based on stationary operation. The current regulation with the current regulators 34 and 35 for the quadrature-axis current and direct-axis current causes a voltage shift toward the direct-axis voltage $U_d$. The shift of the voltage values toward $U_d$ is desirable since this reduces $U_q$ the voltage in the quadrature-axis direction, and consequently, $I_d$ the direct-axis voltage can be shifted further into the negative value range. This means a field-weakening occurs by means of the stator current. The overmodulation value must be selected so that the entire regulation range II (regulation range field-weakening with the reference numeral 12) can be covered.

In the regulation range III, reference numeral 13 according to FIG. 2, the valve triggering is deactivated in the converter bridge 5. The bridge valves no longer switch; in this diode operation regulation range, the converter bridge 5 becomes a simple diode rectifier by means of the parallel diodes. The regulator continues to function, but without having a regulatory effect on the converter bridge 5. The regulation of the stator currents through control of the terminal voltage 10 is conveniently switched off in this regulation range 13. The additional regulation takes place by means of the excitation current 4 in the excitation winding 2 of the electrical machine 1. The regulation of stator currents R, S, T can be switched back on only if the required power can no longer be produced in the regulation range 13.

Naturally, a constantly excited machine can also be regulated according to this method, but without the regulation range III 13. The range of the regulation range III in this case can be completely covered by a field-weakening range (regulation range II). $I_F$ must then be viewed as a constant. The regulation method can be used for both generator and motor operation.

| | |
|---|---|
| 1 | electrical machine |
| 2 | excitation winding |
| 3 | stator winding |
| 4 | excitation current $I_F$ |
| 5 | converter bridge |
| 6 | capacitance |
| 7 | terminal voltage |
| 8 | load |
| 9 | adjustable resistance |
| 10 | phase winding |
| 11 | $1^{st}$ regulation range (field-oriented regulation) |
| 12 | $2^{nd}$ regulation range (field-weakening range) |
| 13 | $3^{rd}$ regulation range (diode operation) |
| 14 | speed |
| 15 | output |
| 16 | output limit |
| 17 | voltage limit |
| 18 | power factor cosφ |
| 19 | network connections |
| 20 | position sensor n, α |
| 21 | current measurement device |
| 22 | current regulator |
| 23 | voltage regulator |
| 24 | decoupling network |
| 25 | transformations R, S, T |
| 26 | PWM generator |
| 27 | control signals |
| 28 | switch element |
| 29.1 | PI component |
| 29.2 | PI component |
| 30 | summation point |
| 31 | precontrol branch |
| 32 | speed signal |
| 33 | excitation current |
| 34 | quadrature-axis current regulator |
| 35 | direct-axis current regulator |
| 36 | direct-axis inductance |
| 37 | quadrature-axis inductance |
| 38 | additional inductance |
| 39 | PI component with limitation |
| 40 | precontrol unit |

What is claimed is:

1. A method for regulating an electrical machine (1), including an excitation winding (2) and a stator winding (3), where the stator winding (3) is connected at its output terminals (10) to a converter bridge (5), and the electrical machine (1) can be operated in the regulation ranges of field-oriented regulation (11), field-weakening operation (12), and diode operation (13), characterized in that the transition from the regulation range (11) to an adjacent regulation range (12) is achieved through an overmodulation of the pulse-to-width modulation (26) and a limitation of the outputs from current regulators (34, 35) of the stator windings (3) of the electrical machine (1) in both generator operation and motor operation.

2. The method according to claim 1, characterized in that the current values of the RST system (1) measured at the output terminals (10) of the electrical machine (1) are transferred into a d, q-system (22, 24, 25) by means of a transformation stage (21).

3. The method according to claim 1, characterized in that the limitation of the outputs of the current regulators (34, 35) takes place in the decoupling network, which current regulators act on the inductances (36, 37) of the stator winding (3).

4. The method according to claim 1, characterized in that the current regulation of the electrical machine (1) is divided into a quadrature-axis current regulation (34) and a direct-axis current regulation (35) of the stator winding (3) with PI components (29.1, 29.2; 39).

5. The method according to claim 4, characterized in that the PI components of the current regulators (34, 35) include a precontrol unit (31, 40) connected to a summation point (30) provided on the output side.

6. The method according to claim 4, characterized in that the current regulators (34, 35) are connected with their outputs to the inputs of a decoupling network (24) and permit a precontrol of the electrical machine (1).

7. The method according to claim 4, characterized in that the current regulators (34, 35) and the decoupling network (24) are connected in series.

8. The method according to claim 2, characterized in that the output values $U_{d, ref}$, $U_{q, ref}$ of the decoupling network (24) contained in the d, q-system are inverse transformed to the terminal values (10) of the RST-system (1) by means of an inverse transformation matrix (25).

9. The method according to claim 4, characterized in that the output values for the quadrature-axis current $i_{q, ref}$ in the current regulator (34) are limited and the direct-axis current id in the stator winding (3) can set itself automatically.

10. The method according to claim 1, characterized in that when the electrical machine (1) is operated in diode operation (13), the converter bridge (5) is operated as a diode rectifier.

11. The method according to claim 10, characterized in that in diode operation, the valves are closed starting at $\cos\phi = -1$.

12. The method according to claim 1, characterized in that during the conductive time of the diode field effect, transistors are switched into a conductive state and the power loss of the electrical machine is reduced.

* * * * *